(No Model.)
R. B. ACKERMAN.
RING.
No. 482,670. Patented Sept. 13, 1892.
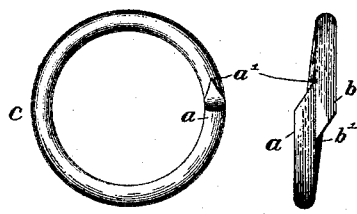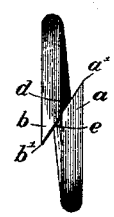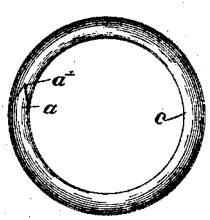
Witnesses
Edw. S. Duvall Jr.
Wm. L. Boyden
Inventor
Rudolph B. Ackerman
per Fred B. Asker
Attorney
THE NORRIS PETERS CO., PHOTO-LITHO., WASHINGTON, D. C.

UNITED STATES PATENT OFFICE.

RUDOLP BERTHOLD ACKERMAN, OF MINNEAPOLIS, MINNESOTA, ASSIGNOR TO JOHN CHESTER LYMAN, OF CHICAGO, ILLINOIS.

RING.

SPECIFICATION forming part of Letters Patent No. 482,670, dated September 13, 1892.

Application filed December 16, 1891. Serial No. 415,211. (No model.)

*To all whom it may concern:*

Be it known that I, RUDOLP BERTHOLD ACKERMAN, a citizen of the United States, residing at Minneapolis, in the county of Hennepin and State of Minnesota, have invented a new and useful Ring, of which the following is a specification.

My invention relates to an improvement in rings to or from which any foreign article may be attached or removed, as keys from a key-ring, and is peculiarly adapted to and designed for a key-ring, although not limited to such use; and the objects of my improvements are, first, to provide simplicity of construction and operation; second, to reduce the friction of the ends of the ring with objects in juxtaposition, and, third, to permit the objects attached thereto to move freely when the ring is closed over the point at which when open objects are attached to or removed from the ring. I attain these objects by the mechanism illustrated in the accompanying drawings, in which—

Figures 1 and 4 show the plane of the ring at right angles to the line of vision. Figs. 2, 3, and 5 show the ring in a perpendicular position and its plane parallel to the line of vision. Figs. 1 and 2 show the ring when closed, Figs. 3 and 4 when open, and Fig. 5 when midway between the open and closed position during the process of its being changed from the one to the other.

Similar letters refer to similar parts throughout the several views.

The ring may be made of metal or other suitable material, the ends overlapping and beveled, as shown in the drawings, and it may be made of any desired shape, though preferably round, as shown in the drawings. The ring is most simply operated by being held firmly at the point $c$, Fig. 5, while at $a\,b$ rotary motion is applied, causing the ends $a$ and $b$ to revolve half-way around one another. The ring being closed, as in Figs. 1 and 2, if this rotary motion above described be applied the points $a'$ and $b'$, from being in close juxtaposition to the ends $b$ and $a$, respectively, will be brought into the position shown in Figs. 3 and 4. In this position the natural resiliency of the material of which the ring is constructed will hold the ends $a$ and $b$ together for the short distance of the overlap, so that although the ring is spoken of as open there will be no danger that objects already on it will fall off; but a very slight pressure on the object which it is desired to remove will suffice to force it between the ends $a$ and $b$, and thus detach it from the ring. In a corresponding manner an object may be readily attached to the ring by so pressing it into the angle made by the bevel $a'\,d$ with the end $b$, or $b'\,e$ with the end $a$, that the ends $a$ and $b$ are forced apart, the one or the other, as the case may be, passing through the hole in the key or other object to be attached to the ring. By again applying the above-described rotary motion to the ends $a$ and $b$ the ring is brought back into the position shown in Figs. 1 and 2, and the resiliency of the material will hold the ends $a$ and $b$ firmly together throughout the entire distance between the points $a'$ and $b'$. When the ring is closed, as shown in Figs. 1 and 2, the ends being beveled, as shown in the drawings, permit any object in passing over the end $b$, to ride readily from the point $a'$ onto the end $a$, and vice versa, and at the same time effectually prevent any such object from being removed from the ring. In the case of a key-ring the force required to produce the rotary motion of the ends $a$ and $b$ around one another is readily applied by the thumb and finger of one hand, while the ring is held firmly at the point $c$ between the thumb and finger of the other hand.

A simple method of construction of my invention is by the use of wire of suitable size and material, whether precious or base metal or other material. Such wire, having been wound in a close spiral around a mandrel of the desired size, may be cut off at such a length and bevel as is required to effect the objects desired to be obtained.

In many cases it will be found that a ring such as described herein will be useful where, in addition to the property of permitting objects to be attached to or removed from it at pleasure, it is desirable to obtain a centripetal or centrifugal spring, force, or resilience—that is, in the plane of the ring.

I am aware that numerous patterns of key-rings have been made prior to my invention, and I am also aware that the most obvious use of my invention is in the form of key-rings; but I can see many other uses in which it can be advantageously employed. I do not, therefore, make a broad claim for the invention of key-rings where a continuous piece of suitable material is so arranged that the ends may be connected or disconnected at pleasure, nor do I, on the other hand, limit my claim to the use of my invention in key-rings.

I am aware that rings have heretofore been constructed consisting of a single piece of spring metal divided at one point and having the ends pointed and inclined; but I am not aware that any ring has ever yet been made out of a single piece of spring metal which has the ends overlapping each other and pressed close together laterally so that the cylindrical or round portions of the ring will be in contact with each other, and said rings being pointed and inclined and laterally rotatable one upon the other, so that when they are in contact in one position each pointed end will be removed from the adjacent round portion of the other end sufficiently far to provide a suitable space through which a key can be passed and placed upon the ring, and when the ends are in their other position of contact each pointed part will lie close against the adjacent round part of the other end, so that the ring will in effect have its ends securely locked together, and it will not be easy, and almost impossible, to remove a key from the ring when the ends are in the latter position. It is thought that this construction and this difference in the operation and use is of great importance, and thereby I am enabled to provide a ring differing in structure and use from anything that has heretofore been devised or used. Furthermore, it will be observed that the entire length of my ring is not situated in the same plane, inasmuch as the two ends overlap, but rather the ring is slightly spiral; but What I do claim as my invention, and desire to secure by Letters Patent, is—

A key-ring formed of round wire, said ring being normally helical in form and with free ends beveled in reverse direction, the cylindrical portion of the ends overlapping and adapted by torsion to have the beveled ends reversed for the insertion of a key, substantially as described.

RUDOLP BERTHOLD ACKERMAN.

In presence of—
M. F. HANLEY,
L. L. LONGBRAKE.